Patented Sept. 12, 1950

2,522,469

UNITED STATES PATENT OFFICE 2,522,469

PROTECTIVE COATING COMPOSITIONS

William J. Sweeney, Summit, N. J., assignor to Standard Oil Development Company, a corporation of Delaware No Drawing. Original application November 24, 1942, Serial No. 466,799. Divided and this application December 28, 1946, Serial No. 719,106

5 Claims. (Cl. 106—186)

This invention relates to the preparation of improved surface coating compositions such as paints, varnishes and lacquers and has, as a principal object, the preparation of improved compositions of this type which have substantial tolerance for water and which can be used under humid conditions and in spite of the presence of moisture on the surfaces to be coated.

This application is a division of application Serial No. 466,799, filed November 24, 1942, now abandoned.

In order to apply an adherent moisture-free permanent coating of paint, lacquer, varnish or the like to metal, wood or other surfaces, it is necessary with the ordinary paints and varnishes heretofore available that the surface be completely dry. It is also generally desirable to apply such paints and varnishes only on dry days or, for interior work, when the inside air has a low humidity. Otherwise, the protective coating does not bond to the surface, blisters are formed, the coating fails and corrosion occurs under the protective coating film or forms pin holes and other film imperfections due to moisture droplets interfering with the formation of an impervious and continuous coating.

The labor and time involved in drying the surface and the delay in awaiting the evaporation of dew or frost from the surface have greatly increased the cost of painting, particularly in the case of metal surfaces of bridges, tanks and ships, as well as in the painting of building siding, roofs, etc.

These delays and difficulties are overcome and the covering and corrosion protective ability of paints, varnishes and the like are greatly improved by the present invention. It has now been found that such improvements are attained by adding to the coating composition a small amount of an organic substituted alkylol amine, in which one or both of the hydrogens attached to the nitrogen are replaced by aliphatic or cyclic hydrocarbon radicals. These compounds are soluble in water and in the hydrocarbon naphthas and the halogen-containing and oxygen-containing organic liquids used as vehicles in paints, varnishes, lacquers and the like coating compositions. Such organic substituted alkylol amines have the property of greatly increasing the metal wetting ability of the paints, etc. when used in concentrations of around 0.1 to 10%. They also impart to the coating compositions the ability of displacing water from the surface of metal, wood, etc., thus preventing its accumulation in or under the coating film. The rusting frequently encountered when wet metal is painted is thus eliminated and protective films of greatly increased durability and permanence are obtained.

The present invention involves the use in corrosion preventive compositions of an organic amine having a structural formula as follows:

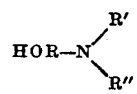

where R consists of an aliphatic hydrocarbon group, R' consists of hydrogen or an aliphatic or cyclic radical where R'' consists of an aliphatic or cyclic radical. These compounds are secondary or tertiary amines of low volatility having a boiling point in excess of about 250° F. so that they are not removed from the film before any water present is substantially evaporated. They are preferably sufficiently volatile to evaporate with the less volatile portions of the paint varnish. Thus suitable compounds preferably have a boiling point between about 250° F. and 420° F., preferably about 320° F., although when used in compositions subjected to baking or forced drying, less volatile compounds boiling up to about 550° F. may be used. The aliphatic hydrocarbon group, R, is preferably of low carbon content, say up to about five carbon atoms or more. The OH radical may be attached to any carbon atom of the radical R. The aliphatic groups designated by R' or R'' are preferably alkyl groups which may contain up to eight carbon atoms although any or all of these can contain up to about twenty carbon atoms and still be of value for the present purpose. The cyclic radical in R' or R'' may be aromatic, naphthenic or heterocyclic and may contain substituents such as OH, NH₂, Cl, etc. There is no limitation as to the number of nuclei, although mono-nuclear groups are more desirable.

The preferred amino compounds for this purpose, however, are those organic amines falling within the formula given above which possess substantial solubility in both oil and water, and in which there is only one HOR— group and this is an ethanol group. Furthermore, it is likewise preferable that R' and R'' be aliphatic groups containing up to four carbon atoms. Diethyl aminoethanol, sometimes referred to as hydroxy ethyl diethylamine, possessing the formula

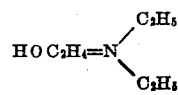

and possessing a pH of about 10, has been found admirably adapted for this purpose. Another good amine suited for this service is dibutyl aminoethanol. A further example of an amine showing fair service for the present purpose is (p-tertiary amyl phenyl) monoethanolamine

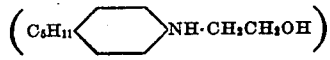

These amino compounds are generally employed in small amounts, i. e., about 0.1 to 5%, although in some cases as much as 10% or more may be found desirable.

Further examples of the preferred alkyl amino alkylol compounds for use in this invention include Dimethyl amino ethanol $(CH_3)_2NCH_2CH_2OH$
Diethyl amino ethanol $(C_2H_5)_2NCH_2CH_2OH$
Methyl amino ethanol $CH_3NHCH_2CH_2OH$ The surface coating compositions of the present invention are characterized by the ability to form a tough permanent film on the surfaces coated and are thus distinguished from the greaselike or oily rust proofing and slushing compositions which are used to provide soft, oily coats primarily for rust proofing highly machined metal surfaces and which are intended for temporary protection and are readily soluble in lubricating oils or other suitable solvents which are used for their removal.

The effectiveness of the compositions of the present invention is demonstrated by the following tests which are presented in illustration thereof.

A tung oil varnish containing small amounts of boiled linseed oil, rosin gum, drier and a naphtha diluent, and the same varnish having added thereto 3% by weight of diethyl amino ethanol, were sprayed on duplicate test panels which were treated as described in the following table. These panels were then dried until a hard, non-tacky varnish film was obtained, and were then examined, in one case after an additional test of the dried panel in a humidifier, the results being also given in the following table:

especially those intended for marine uses and may also contain fungicides and like protective agents, such as copper. An example of a suitable lacquer to which the above-described improving agents may be added in amounts preferably of about 2 or 3% by weight is:

| | Parts |
|---|---|
| Nitrocellulose (½ sec.) | 15 |
| Ethyl alcohol | 40 |
| Benzene | 40 |
| Butyl acetate | 80 |
| Butyl alcohol | 20 |
| Ethyl acetate | 9 |
| Castor oil | 1 |

An example of a suitable varnish for similar use in this invention is:

| | Parts |
|---|---|
| Kauri gum | 80 |
| Rosin | 20 |
| Linseed oil | 116 |
| Tung oil (raw) | 40 |
| Lime | 2 |
| Lead oxide | 2.5 |
| Manganese acetate | 0.5 |
| Turpentine | 200 |

The various specific examples presented herein are presented for the purpose of illustrating suitable embodiments of this invention, but the invention is not to be limited to such examples but also includes various modifications thereof which come within the scope of this invention as described broadly herein.

I claim:

1. An improved non-pigmented surface coating composition which forms a hard permanent film on drying, consisting essentially of a solution of a drying oil and a natural, hydrophobic water-insoluble resin in a vaporizable organic vehicle where in the ratio of said drying oil to said resin is about 1.5 to 1, said solution also containing 0.1 to 10% of an oil-soluble and water-soluble, unesterified hydrocarbon-substituted

*Varnishing wetted surfaces*

| | | Varnish | |
|---|---|---|---|
| | Varnish Sprayed on Following | Straight | +3% Diethyl Amino Ethanol |
| 1 | Glass panel sprinkled with water | Film Discontinuous | Film Continuous. |
| 2 | Sand blasted steel panels daubed with water | Rusted | No Rusting. |
| 3 | Polished steel sprayed with water | Film Discontinuous | Film Continuous. |
| 4 | No. 3 above placed in humidifier 72 hours | Numerous rust spots | Trace of Rusting. |

It is thus apparent that the spreading and rust proofing properties of the varnish were greatly improved, even under the very severe test conditions of application to a polished steel panel which had been freshly sprayed with water.

As indicated above, improved coating compositions of this invention may be prepared by adding the above-described improving agents to paints, varnishes, lacquers, enamels and the like. These include compositions containing drying oils with or without pigments, resins and/or volatile thinners, of the nature of paints and varnishes, also compositions containing resins, nitrocellulose and like film-forming materials in volatile solvents, of the nature of lacquers, also compositions containing rubber, asphalt and the like, as well as drying oils. Such compositions include mono-hydroxy amine having a boiling point between about 250 and 500° F. and having a structural formula

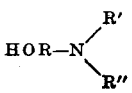

wherein R is an aliphatic hydrocarbon group of 1 to 5 carbon atoms, R' is a member of the class consisting of hydrogen and alkyl radicals having up to 8 carbon atoms, and R" is an alkyl radical having up to 8 carbon atoms, whereby the moisture tolerance of the total composition is increased so that it may be applied directly to a surface wet with water.

2. The composition defined in claim 1 wherein HOR is an ethanol radical and wherein R' and R″ are alkyl radicals, each having up to 4 carbon atoms, the amine having a boiling point between about 250 and 420° F.

3. The composition defined in claim 1 wherein the amine is diethyl ethanolamine.

4. A clear, non-pigmented varnish composition which forms a hard permanent film on drying, consisting essentially of a solution of a vegetable drying oil and a natural, hydrophobic water-insoluble resin in a naphtha diluent, said solution containing the drying oil and the resin in a ratio of about 1.5 to 1 and also containing about 2 to 10 weight percent of an unesterified, alkyl-substituted, monohydroxy amine having a boiling point between 250 and 420° F. and having one ammonia hydrogen atom substituted by an alkanol radical of up to 5 carbon atoms, and also having at least one other ammonia hydrogen atom substituted by an alkyl radical of less than 3 carbon atoms, whereby the moisture tolerance of the coating composition is increased so that it may be applied directly to a surface wet with water.

5. A clear, non-pigmented varnish composition which forms a hard permanent film on drying, consisting essentially of about 80 parts kauri gum, 20 parts rosin, 116 parts linseed oil, 40 parts tung oil, 2 parts lime, 2.5 parts lead oxide, 0.5 parts manganese acetate, and 200 parts of turpentine, said composition also containing diethyl ethanolamine in a concentration of 2 to 3 weight percent.

WILLIAM J. SWEENEY.

REFERENCES CITED

The following references are of record in the file of this patent:

UNITED STATES PATENTS

| Number | Name | Date |
| --- | --- | --- |
| 2,146,873 | Wilmahns | Feb. 14, 1939 |
| 2,192,953 | Sloan et al. | Mar. 12, 1940 |
| 2,199,927 | Underwood | May 7, 1940 |
| 2,317,131 | Conamay | Apr. 20, 1943 |
| 2,362,332 | Zimmer et al. | Nov. 7, 1944 |
| 2,341,994 | Kinsbury | Feb. 15, 1944 |